United States Patent [19]

Mori et al.

[11] Patent Number: 4,707,234
[45] Date of Patent: Nov. 17, 1987

[54] METHOD FOR SEPARATING AN ACID AND AN ALKALI FROM AN AQUEOUS SOLUTION OF A SALT

[75] Inventors: Takashi Mori; Kenichi Fukuda; Yasuhiro Kurauchi, all of Shin-nanyo, Japan

[73] Assignee: Toyo Soda Manufacturing Co., Ltd., Shin-nanyo, Japan

[21] Appl. No.: 922,727

[22] Filed: Oct. 24, 1986

[30] Foreign Application Priority Data

Oct. 25, 1985 [JP] Japan .................. 60-237655
Oct. 25, 1985 [JP] Japan .................. 60-237656
Oct. 25, 1985 [JP] Japan .................. 60-237657
Aug. 14, 1986 [JP] Japan .................. 61-189537

[51] Int. Cl.⁴ .......................................... C25D 13/00
[52] U.S. Cl. .................................. 204/182.3; 204/296
[58] Field of Search ............... 204/98, 128, 103–104, 204/151, 180.1, 182.3, 296

[56] References Cited

U.S. PATENT DOCUMENTS

4,076,604  2/1978  Murayama et al. ............ 204/98
4,111,780  9/1978  Murayama et al. ............ 204/98
4,312,720  1/1982  Lefevre ........................ 204/98
4,357,217 11/1982  Kuehn ......................... 204/98

Primary Examiner—R. L. Andrews
Attorney, Agent, or Firm—Oblon, Fisher, Spivak, McClelland, & Maier

[57] ABSTRACT

A method for separating an acid and an alkali from an aqueous solution of a salt by an ion exchange membrane electrolysis wherein anion and cation exchange membranes are used as diaphragms and wherein the acid is formed in an anode compartment, and the alkali is formed in a cathode compartment, characterized in that the cation exchange membrane is a fluorinated cation exchange membrane and the anion exchange membrane is a fluorinated anion exchange membrane with the ion exchange capacity varied from one side to the other side.

10 Claims, 2 Drawing Figures

METHOD FOR SEPARATING AN ACID AND AN ALKALI FROM AN AQUEOUS SOLUTION OF A SALT

The present invention relates to a method for separating an acid and an alkali from an aqueous solution of a salt by an ion exchange membrane electrolysis. More specifically, the present invention relates to a method for separating an acid and an alkali from an aqueous solution of a salt by an ion exchange membrane electrolysis wherein a certain specific fluorinated anion exchange membrane and a fluorinated cation exchange membrane are used as diaphragms.

The method of the present invention may be useful in various fields of applications and is particularly effective for use in the field of waste liquid treatment.

There are numerous neutralization steps in various plants such as chemical plants, plating plants or semiconductor plants. Salts discharged from such plants are enormous both in the variety and the amounts. If disposed untreated, such salts create environmental problems. Especially, in the treatment of salt waste liquids containing hazardous substances such as radio active substances like in the case of atomic energy-related installations, it is necessary to conduct the treatment completely within the installation sites. Accordingly, it is strongly desired to develop a treatment system which is capable of concentrating hazardous substances such as radio active substances in waste liquids and at the same time, capable of separating and recovering acids and alkalis from the salt waste liquids for reuse.

It is impossible to separate an acid and an alkali from a salt by an ordinary chemical reaction, and it is necessary to use an ion exchange resin or an ion exchange membrane. The ion exchange membrane electrolysis has attracted an attention as a process which is, in principle, capable of treating a large amount of a salt and capable of efficiently separating an acid and an alkali by simple operation, as compared with the ion exchange resin method. For instance, in recent years, for the removal of sulfur dioxide gas ($SO_2$) in the exhaust fume from a thermal power station, it has been common to employ a wet system whereby $SO_2$ gas is absorbed by using sodium hydroxide, and it has been proposed to separate a Glauber's salt ($Na_2SO_4$) formed by this process, by an ion exchange electrolysis and recover as sodium hydroxide and sulfuric acid In this process, a fluorinated cation exchange membrane (such as a Nafion membrane manufactured by DuPont Co.) is used between a cathode compartment and an intermediate compartment into which an aqueous Glauber's salt solution is introduced, and a highly porous diaphragm or a highly porous diaphragm and a hydrocarbon-type anion exchange membrane are used between the intermediate compartment and the anode compartment, so that sodium hydroxide is formed in the cathode compartment, and sulfuric acid is formed in the anode compartment. This process is effective as a method for separating a salt into an acid and an alkali, but involves some problems. Namely, when a finely porous diaphragm is used between the intermediate compartment and the anode compartment, it is impossible to avoid the inclusion of sodium sulfate into sulfuric acid formed in the anode compartment. Even when the finely porous diaphragm is combined with a hydrocarbon-type cation exchange membrane, the durability (the heat resistance, acid resistance or oxidation resistance) of the hydrocarbon-type cation exchange membrane is problematic.

The problem relating to the durability of the hydrocarbon-type cation exchange memebrane becomes more serious in the case of a high temperature electrolysis at a level of 60° C. or higher or in a system wherein an acid having a higher oxidative effect than sulfuric acid, such as nitric acid, hydrochloric acid, hydrofluoric acid or chromic acid is to be separated, whereby the economical advantage of the process for the separation of a salt into an acid and an alkali by the ion exchange membrane electrolysis will be lost.

For instance, Japanese Unexamined Patent Publication No. 37596/1983 discloses a process wherein an ion exchange membrane electrolysis is employed for the concentration treatment of a nitrate-containing radio active waste liquid resulting from an atomic energy-related installation. This process is also designed to supply the nitrate solution into an intermediate compartment and to form nitric acid in the anode compartment and an alkali metal hydroxide or ammonium hydroxide in the cathode compartment. However, employed is a three-compartment type electrolytic cell wherein a hydrocarbon-type anion exchange membrane is disposed between the intermediate compartment and the anode compartment, and a fluorinated cation exchange membrane (such as a Nafion membrane manufactured by DuPont Co.) is disposed between the intermediate compartment and cathode compartment. With respect to this process, it is disclosed that the concentration in the anode compartment and the cathode compartment is maintained at a level of not higher than 0.5 M/liter for economical electrolysis. The reason is described to be to maintain the current efficiency at an economical level. However, it is believed that there is also a problem in the durability of the hydrocarbon-type cation exchange membrane itself.

Further, there is another important problem common to anion exchange membranes. It is a problem relating to the permeability of $H^+$ ions In general, anion exchange membranes tend to more readily permit the permeation of $H^+$ ions as the concentration of the acid in the solution contacting the membranes becomes higher. Accordingly, in such an electrolytic process, the transport number of the anions tends to be low, and consequently the current efficiency decreases.

As mentioned above, in Japanese Unexamined Patent Publication No. 37596/1983, it is disclosed to maintain the concentration of the anode compartment and the cathode compartment at a level of not higher than 0.5 M/liter in order to maintain the current efficiency at an economical level. However, it is believed that in addition to the above-mentioned problem in the durability of the hydrocarbon-type anion exchange membrane, there is an additional problem such that when the acid concentration in the anode compartment is increased, a considerable amount of $H^+$ ions will permeate from the anode compartment to the intermediate compartment, whereby the current efficiency will substantially deteriorate.

When the overall efficiency of the entire process including the current efficiency is taken into accounts, for the separation of a salt into an acid and an alkali, it is of course desirable to separate a salt in an concentration as high as possible and recover an acid and an alkali in concentrations as high as possible. However, the durability of a hydrocarbon-type anion exchange membrane in a highly concentrated high temperature nitric acid solution is not satisfactory.

In an acid solution having a high concentration at a high temperature, a hydrocarbon-type anion exchange membrane shows a remarkable increase in the electric resistance of the membrane in a period as short as one month, whereby the cell voltage increases. Accordingly, if it is attempted to conduct such a process by using the conventional hydrocarbon-type anion exchange membrane in such a highly concentrated high temperature acid solution, it is obliged to frequently replace the anion exchange membrane, and consequently, the economical merit of the process itself will be lost. More specifically, when the salt is a chloride, a chlorine gas is generated at the anode, and a hydrocarbon-type anion exchange membrane is not durable against such a strongly oxidative gas like the chlorine gas. In an extreme case, the membrane will be destroyed in a period as short as about two weeks. Accordingly, it has been believed practically impossible to separate a chloride into hydrochloric acid and an alkali by an ion exchange membrane electrolysis.

Further, in order to separate and recover a solution of an acid in a high concentration, the conventional hydrocarbon-type anion exchange membrane is required to be improved to solve the problem relating to the decrease in the current efficiency due to the permeation of $H^+$ ions in addition to the problem relating to the durability of the anion exchange membrane. More specifically, the present inventors have made a similar study also on a fluorinated anion exchange membrane having excellent durability, and have found that no adequate improvement can be made in the prevention of the permeation of $H^+$ ions with the usual fluorinated anion exchange membrane although a slight improvement can be observed as compared with the hydrocarbon-type anion exchange membranes.

As described in the foregoing, the separation of an acid and an alkali from an aqueous solution of a salt by an ion exchange membrane electrolysis is a known technique and is desired to be developed as a practical industrial process. Nevertheless, because of various restrictive conditions for the process and a number of problems to be solved, it has not yet been developed as a satisfactory industrial process.

It is an object of the present invention to remove various restrictive conditions such as the type of the salt, the acid concentration, the temperature for electrolysis, etc. which used to be drawbacks in the conventional method for the separation of a salt into an acid and an alkali by an ion exchange membrane electrolysis and to provide an ion exchange membrane electrolysis which is capable of efficiently separating an aqueous solution of a salt and recovering an acid and an alkali in high concentrations.

Under the circumstances, the present inventors have conducted extensive researches on the method for separation of a salt into an acid and an alkali by an ion exchange membrane electrolysis, particularly on the problems relating to the durability and the permeability of $H^+$ ions of the anion exchange membranes. As the results, the present inventors have found (i) that a fluorinated anion exchange membrane having a specific structure exhibits excellent durability and other properties, (ii) that a fluorinated anion exchange membrane with the ion exchange capacity varied from one side to the other side is capable of substantially suppressing the permeation of $H^+$ ions and has excellent durability, and (iii) that a fluorinated anion exchange membrane prepared in a certain specific process is capable of substantially suppressing the permeation of $H^+$ ions and has excellent durability. Further, it has been found that by an electrolytic operation in which such special fluorinated anion exchange membranes and fluorinated cation exchange membranes are employed, it is possible to separate and recover acids and alkalis in high concentrations efficiently from various kinds of aqueous solutions of different salts. The present invention has been accomplished on the basis of these discoveries.

According to the first aspect, the present invention provides a method for separating an acid and an alkali from an aqueous solution of a salt by an ion exchange membrane electrolysis wherein anion and cation exchange membranes are used as diaphragms and wherein the acid is formed in an anode compartment, and the alkali is formed in a cathode compartment, characterized in that the cation exchange membrane is a fluorinated cation exchange membrane and the anion exchange membrane is a fluorinated anion exchange membrane with the ion exchange capacity varied from one side to the other side.

According to the second aspect, the present invention provides a similar method which is characterized in that the cation exchange membrane is a fluorinated cation exchange membrane and the anion exchange membrane is a fluorinated anion exchange membrane made of a copolymer having repeating units of the formula:

wherein X is F or $CF_3$, l is an integer of from 0 to 5, m is 0 or 1, n is an integer of 1 to 5, each of p and q is a positive number and the ratio of p/q is from 2 to 16, and Y is a group involving a quaternary ammonium group.

According to the third aspect, the present invention provides another similar method which is characterized in that the cation exchange membrane is a fluorinated cation exchange membrane and the anion exchange membrane is a fluorinated anion exchange membrane prepared by subjecting a carboxylate membrane made of a copolymer having repeating units of the formula:

wherein X is F or $CF_3$, l is an integer of from 0 to 5, m is 0 or 1, n is an integer of from 1 to 5, and p/q is from 4 to 16, and R is an alkyl group, to an acid or base treatment, and then introducing anion exchange groups thereinto.

Now, the present invention will be described in detail with reference to the preferred embodiments.

Referring to the accompanying drawings.

Referring to the first aspect of the present invention, the fluorinated anion exchange membrane with the ion exchange capacity varied from one side to the other side usually has a ratio in the ion exchange capacity between one side and the other side being within a range of from 1.1 to 6.0, preferably from 1.3 to 4.0. If the ratio in the ion exchange capacity is less than the above range, the effect for suppressing the permeation of H+ ions tends to be inadequate. On the other hand, if the ratio in the ion exchange capacity exceeds the above range, the electric resistance of the membrane tends to increase.

Referring to the second aspect of the present invention, the fluorinated anion exchange membrane having a specific structure is made of a copolymer having repeating units of the formula I. The fluorinated anion exchange membrane to be employed in the present invention, preferably has, as the group involving a quaternary ammonium group, a group of the formula:

wherein each of $R^1$, $R^2$ and $R^3$ is a lower alkyl group, provided that $R^1$ and $R^2$ may together form a tetramethylene group or a pentamethylene group, and $Z^\ominus$ is a halogen anion; a group of the formula:

wherein each of $R^1$, $R^2$ and $R^3$ is a lower alkyl group, provided $R^1$ and $R^2$ may together form a tetramethylene group or a pentamethylene group, $R^4$ is a hydrogen atom or a lower alkyl group, and $Z^\ominus$ is a halogen anion; a group of the formula:

wherein each of $R^1$, $R^2$ and $R^3$ is a lower alkyl group, provided $R^1$ and $R^2$ may together form a tetramethylene group or a pertnmethylene group, each of $R^4$ and $R^5$ is a hydrogen atom or a lower alkyl group $Z^\ominus$ is a halogen anion, and a is an interger of from 3 to 7; or a group of the formula:

wherein each of $R^1$, $R^2$, $R^3$ is a lower alkyl group, provided $R^1$ and $R^2$ may together form a tetramethylene group or a pentamethylene group, $R^4$ is a hydrogen atom or a lower alkyl group, $Z^\ominus$ is a halogen anion, and b is an interger of from 2 to 10.

Aa specific examples of the fluorinated anion exchange membranes, those having the following structures may be mentioned:

-continued

Further, as anion exchange groups of these florinated anion exchange membranes, i.e. as substituent Y in the formula I, the following groups may be mentioned:

The fluorinated anion exchange membranes having such structures, have excellent heat resistance, acid resistance and oxidation resistance. For instance, while hydrocarbon-type anion exchange membranes show no substantial durability against a strongly oxidative gas such as a chlorine gas, and in an extreme case, they are likely to be destroyed even in a period as short as about two weeks, the fluorinated anion exchange membranes having the above structures undergo no substantial degradation even upon expiry of a half a year.

Now, according to the third aspect of the present invention, the fluorinated anion exchange membrane obtained by a special process is the one prepared by subjecting a carboxylate membrane of a copolymer having repeating units of the formua II to an acid or base treatment, and then introducing anion exchange groups thereinto.

More specifically, one side or both sides of a carboxylate membrane made of a copolymer of the formula II such as $$\begin{CD}-(CF_2-CF_2)_{p1}(CF_2-CF)_{q1}-\\ | \\ O \\ | \\ CF_2 \\ | \\ CF_3-CF \\ | \\ O-CF_2-CF_2-CF_2-COOCH_3\end{CD} \quad (1)$$

$$\begin{CD}-(CF_2-CF_2)_{p2}(CF_2-CF)_{q2}-\\ | \\ O \\ | \\ CF_2 \\ | \\ CF_3-CF \\ | \\ O-CF_2-COOCH_3\end{CD} \quad (2)$$

$$\begin{CD}-(CF_2-CF_2)_{p3}(CF_2-CF)_{q3}-\\ | \\ O \\ | \\ CF_2 \\ | \\ CF_2-CF_2-COOCH_3\end{CD} \quad (3)$$

are subjected to an acid or base treatment, followed by the introduction of anion exchange groups.

As the acid or base to be employed, hydrochloric acid sulfuric acid or nitric acid, or aqueous ammonia or sodium hydroxide, may be employed. The acid or base treatment may be conducted at a temperature within a range of from 0° to 80° C. It is surprising that by such acid or base treatment, the permeability of H$^+$ ions of the finally obtained fluorinated anion exchange membrane is substantially suppressed.

The thickness of the membrane to be treated by the acid or base is usually within a range of from 1 to 80% of the entire membrane thickness, preferably within a range of from 10 to 50% of the entire thickness. If the acid or base-treated thickness is less than the above range, the effect for suppressing the permeability of H$^+$ ions of the finally obtained anion exchange membrane tends to be inadequate. On the other hand, if the acid or base-treated thickness exceeds the above range, the electric resistance of the finally obtained anion exchange membrane tends to increase.

The fluorinated anion exchange membrane obtained by the special process according to the third aspect of the present invention, is obtainable by the introduction of anion exchange groups subsequent to the above-mentioned acid or base treatment.

The following three routes may be mentioned as methods for the introduction of the anion exchange groups to the membrane treated with an acid or base as mentioned above.

Route 1

R$_f$COOR$^4$ $\longrightarrow$ acid or base treatment $\longrightarrow$

R$_f$CONR$^1$R$^2$ $\longrightarrow$ R$_f$CH$_2$NR$^1$R$^2$ $\xrightarrow{R^3Z}$ R$_f$CH$_2$\overset{\oplus}{N}R$^1$R$^2$R$^3$Z$^-$ wherein:
R$^1$, R$^2$, R$^3$ = lower alkyl group,
R$^4$ = lower alkyl group,
Z$^\ominus$ = halogen anion, BF$_4^\ominus$, SbCl$_6^\ominus$, $$\overset{O}{\underset{\|}{\overset{\ominus}{O}SR^5}} \text{ or } \overset{O}{\underset{\|}{\overset{\ominus}{O}CR^5}}$$

wherein R$^5$ = lower alkyl group, substituted or unsubstituted phenyl group, or lower perfluoroalkyl group.

$$R_f = -[(CF_2CF_2)_{p'}(CF_2CF)_{q'}]- \\ \phantom{R_f = } [O(CF_2-CF-O)_m(CF_2)_n] \\ \phantom{R_f = xxxxxxxxxxx} X$$

wherein X is F or CF$_3$, l is an interger of from 0 to 5, m is 0 or 1, n is an integer of from 1 to 5, and p/q is from 4 to 16.

Now, Route 1 will be described.

The membrane treated with an acid or base and dried under reduced pressure, is reacted with a lower dialkylamine of the formula:

HNR$^1$R$^2$ \hspace{2em} (1)

to convert it to a carboxyic acid amide membrane. As the lower dialkylamine of the formula (1), there may be mentioned dimethylamine, diethylamine, dipropylamine or methyl ethyl amine. The reaction with such an amine may be conducted by contacting a gaseous amine to the membrane, or in a liquid amine or by using a solvent. As such a solvent, an ether such as diethyl ether, tetrahydrofuran or dioxane, or a hydrocarbon such as benzene, toluene or hexane, may be employed.

The carboxylic acid amide membrane thus obtained, can be converted to an amine membrane by reacting it with a reducing agent. As the reducing agent, lithium aluminum hydride, diborane or the like may be employed From the viewpoint of the reaction efficiency, it is preferred to employ diborane. The diborane to be used, may be generated, for example, by reacting a boron trifluoride-ether complex to sodium borohydride, or various complexes of borane, such as a dimethylsulfide complex, may be employed.

The reaction can be smoothly conducted in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The amine membrane thus obtained is reacted with an alkylating agent (R$^3$Z) for alkylation (quaternization), whereby it can be converted to a membrane having quaternary ammonium groups. As the alkylating agent, there may be employed methyl iodide, ethyl bromide, n-propyl bromide, trimethyloxonium fluoroborate ((CH$_3$)$_3$OBF$_4$), triethyloxonium fluoroborate ((C$_2$H$_5$)$_3$OBF$_4$), trimethyloxonium hexachloroantimonate ((CH$_3$)$_3$OSbCl$_6$) or methyl trifluoromethanesulfonate. For this alkylation, methanol, ethanol, methylene chloride, chloroform, carbon tetrachloride or the like may be employed as the solvent. Here, if it is necessary to exchange the counter ions of the membrane having the groups involving quaternary ammonium groups thus obtained, such an exchange of the counter ions can be conducted by the treatment with an alkali metal salt by a conventional method.

Route 2 wherein $R^6$ is a hydrogen atom or a lower alkyl group, each of $R^7$, $R^8$ is a lower alkyl group, or $R^6$ and $R^7$ may together form a polymethylene group of the formula $(CH_2)_a$ wherein a is an integer of 2 or 3, and $R^3$, $Z^\ominus$ and $R_f$ are as defined above.

Now, Route 2 will be described.

The membrane treated with an acid or base, is reacted with a diamine having the formula:

(2)

to convert it to an aminocarboxylic acid amide membrane. As the diamine of the formula (2), N,N-dimethylethylenediamine, N,N,N'-trimethylethylenediamine, N-methylpiperazine or N-propylpiperazine may be mentioned. Instead of the above diamine, a corresponding silyl amine with the above formula (2) in which the hydrogen atom on the nitrogen atom is replaced by a trimethylsilyl group, may be employed.

The reaction with such a diamine, may be conducted in a liquid amine or by using a solvent As such a solvent, an ether such as diethyl ether, tetrahydrofuran or dioxane, or a hydrocarbon such as benzene, toluene or hexane, may be employed.

The aminocarboxylic acid amide membrane thus obtained, may be converted to a diamine membrane by reacting it with a reducing agent. As such a reducing agent, lithium aluminum hydride or diborane may be employed. In view of the reaction efficiency, it is preferred to employ diborane. The diborane to be used, may be generated, for example, by reacting a boron trifluoride-ether complex to sodium borohydride, or various complexes of borane such as a dimethylsulfide complex, may be employed.

The reaction can be conducted smoothly in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The diamine membrane thus obtained may be reacted with an alkylating agent for alkylation, whereby it can be converted to a membrane having the groups involving quaternary ammonium groups. As the alkylating agent, there may be employed methyl iodide, methyl bromide, n-propyl bromide, trimethyloxonium fluoroborate $((CH_3)_3OBF_4)$, triethyloxonium fluoroborate $((C_2H_5)_3OBF_4)$, trimethyloxonium hexachloroantimonate $((CH_3)_3OSbCl_6)$ or methyl trifluoronethane sulfonate. For this alkylation, methanol, ethanol, methylene chloride, chloroform or carbon tetrachloride may be employed as the solvnet.

Here, if it is necessary to exchange the counter ions of the membrane having the groups involving quaternary ammonium groups thus obtained, such an exchange may be conducted by the treatment with an alkali metal salt by a conventional method.

Route 3 wherein $R^9$ is a hydrogen atom or a lower alkyl group, each of $R^{10}$ and $R^{11}$ is a lower alkyl group, or $R^9$ and $R^{10}$ may together form a polymethylene chain of the formula $(CH_2)_c$ wherein c is an integer of 2 or 3, b is an integer of from 3 to 7, and $R^3$, $Z^\ominus$ and $R_f$ are as defined above.

Now, Route 3 will be described.

The membrane treated with an acid or base is reacted with a diamine having the formula:

(3)

to convert it to an aminocarboxylic acid amide membrane. As the diamine of the formula (3), N,N,-dimethylpropane-diamine, N,N,N'-trimethylpropanediamine, N,N-dimethylbutylenediamine, N,N,N'-trimethylbutylenediamine or N,N-diethylpropanediamine may be mentioned. Instead of the above diamine, a corresponding silyl amine having the formula (3) with the hydrogen atom on the nitrogen atom replaced by a trimethylsilyl group, may be employed.

The reaction with such a diamine, may be conducted in a liquid amine or by using a solvent. As such a solvent, an ether such as diethyl ether, tetrahydrofuran or dioxane, or a hydrocarbon such as benzene, toluene or hexane, may be employed.

The aminocarboxylic acid amide membrane thus obtained may be converted to a diamine membrane by reacting it with a reducing agent. As such a reducing agent, lithium aluminum hydride or diborane may be employed. However, from the viewpoint of the reaction efficiency, it is preferred to employ diborane. The diborane to be used, may be generated, for instance, by reacting a boron trifluoride-ether complex to sodium bcrohydride, or various complexes of borane, such as a methyl sulfide complex, may be employed.

The reaction may be conducted smoothly in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The diamine membrane thus obtained may be reacted with an alkylating agent for alkylation, whereby it can be converted to a membrane having the groups involving quaternary ammonium groups. As such an alkylating agent, there may be mentioned methyl iodide, methyl bromide, n-propyl bromide, trimethyloxonium fluoroborate (($CH_3)_3OBF_4$), triethyloxonium fluoroborate (($C_2H_5)_3OBF_4$), trimethyloxonium hexachloroantimonate (($CH_3)_3OSbCl_6$) or methyl trifluoromethanesulfonate. For this alkylation, methanol, ethanol, methylene chloride, chloroform or carbon tetrachloride may be employed as the solvent.

Here, if it is necessary to exchange the counter ions of the membrane having the groups involving quaternary ammonium groups thus obtained, such an exchange can be conducted by the treatment with an alkali metal salt by a conventional method.

The anion exchange membranes thus prepared, may have substantially the same structures as the specific examples given above with respect to the second aspect of the present invention.

The special fluorinated anion exchange membranes used in the present invention usually have an ion exchange capacity of from 0.16 to 3.0 meq/g dry resin, preferably from 0.5 to 2.8 meq/g dry resin. If the ion exchange capacity is less than the above range, the membrane resistance tends to be high, the cell voltage tends to be high, and the cost for electric power will increase. On the other hand, if the ion exchange capacity exceeds the above range, there will be a problem such as the swelling or disintegration of the membrane, which tends to interfere with a constant stabilized electrolytic operation.

The thickness of the fluorinated anion exchange membrane to be used in the present invention, is usually within a range of from 40 to 500 μm, preferably from 100 to 300 μm. A reinforcing material may be incorporated to the fluorinated anion exchange membrane to be used in the present invention, to increase the strength of the membrane.

According to the present invention, it is made possible to separate highly concentrated acids and alkalis efficiently from various kinds of aqueous solutions of different salts by an electrolytic operation wherein the above-described fluorinated anion exchange membranes and the after-mentioned fluorinated cation exchange membranes.

As the fluorinated cation exchange membrane to be used in the present invention, conventional cation exchange membranes such as Nafion membranes manufactured by DuPont Co. may be employed.

As the anode and cathode of the electrolytic cell to be employed in the present invention, there may be employed conventional electrode materials. Inexpensive and corrosion resistant electrode materials having a low overvoltage, are suitably selected taking into accounts the particular electrolytic process. As such electrode materials, there may be employed an anode comprising a corrosion resistant substrate such as Ti, Ta, Zn or Nb coated on its surface with a platinum group metal such as Pt, Ir or Rn and/or a platinum group metal oxide, and a cathode comprising a metal such as Fe, Ni or Cu or an alloy thereof, or such a metal or alloy coated on its surface with a substance showing a low overvoltage, such as Raney nickel, as the cathode.

In the ion exchange membrane electrolysis of the present invention, the electrolytic cell usually comprises three compartments i.e. an anode compartment, an intermediate compartment and a cathode compartment, and an anion exchange membrane is disposed between the anode compartment and the intermediate compartment, and a cation exchange membrane is disposed between the intermediate compartment and the cathode compartment.

When a fluorinated anion exchange membrane having the ion exchange capacity varied from one side to the other, is employed in the present invention, it is preferred to dispose the membrane so that the side having a smaller ion exchange capacity faces the strong acid side i.e. the anode compartment side and the side having a larger ion exchange capacity faces the intermediate compartment side, whereby a substantial increase of the current efficiency can be expected.

Likewise, when a fluorinated anion exchange membrane prepared by the special process is employed wherein only one side was treated by the acid or base treatment, it is preferred to dispose the anion exchange membrane so that the acid or base-treated side faces the strong acid side i.e. the anode compartment side, and the side not subjected to the acid or base treatment faces the intermediate compartment side, whereby a substantial increase in the current efficiency can be expected.

Further, when a large amount of a salt solution is to be treated, it is possible to employ an efficient electrolytic method wherein a layer-built cell is used.

An aqueous solution of a salt is supplied to the intermediate compartment. The concentration of the solution varies depending upon the degree of concentration of the salt in the preceding step in the case of e.g. a waste liquid treatment. However, it is supplied usually at a concentration within a range of from 0.1 mol/liter to the saturation concentration.

Further, the concentrations of the acid and the alkali in the anode compartment and the cathode compartment, respectively, can be raised to a level as high as at least 0.6 mol/liter by virtue of the excellent durability of the anion exchange membrane used in the present invention. The operation is usually conducted at a high concentration region of at least 1 mol/liter and to a level of 10 mol/liter.

In the ion exchange membrane electrolysis of the present invention, the temperature for electrolysis may be from room temperature to 100° C., and the operation can usually be conducted at a current density of from 5 to 50 A/dm$^2$.

As described in the foregoing, according to the present invention, it is possible to separate acids and alkalis efficiently and in high concentrations from various aqueous solutions of salts by an ion exchange membrane electrolysis in which the special anion exchange membranes are employed.

The method of the present invention may be employed in various fields of applications. However, it has a particularly high industrial value for application to the field of waste water treatment.

Now, the present invention will be described with reference to Examples. However, it should be understood that the present invention is by no means restricted to these specific Examples.

EXAMPLE 1 AND COMPARATIVE EXAMPLE 1

An electrolytic process for the production of nitric acid and sodium hydroxide from an aqueous sodium nitrate solution by an ion exchange membrane electrolysis, was conducted.

As the anion exchange membrane, a fluorinated anion exchange membrane (ion exchange capacity 1.10 meq/g dry resin, thickness: 140 μm) having the following formula:

was used. As the cation exchange membrane, a Nafion membrane manufactured by DuPont Co. was used.

Figure 1:
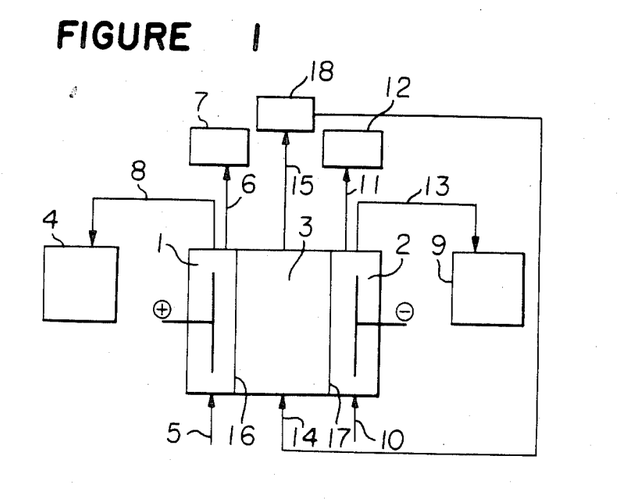
FIG. 1 is a schematic view illustrating an electrolytic process of the present invention.

This electrolytic scheme is illustrated in FIG. 1. The electrolytic cell is a three-compartment type electrolytic cell comprising an anode compartment 1, an intermediate compartment 3 and a cathode compartment 2. The anode compartment 1 and the intermediate compartment 3 is partitioned by an anion exchange membrane 16, and the intermediate compartment 3 and the cathode compartment 2 is partitioned by a cation exchange membrane 17.

In the anolyte, nitric acid is formed by $H^+$ ions formed by the oxygen gas generation reaction as the anode reaction and $NO_3^-$ ions permeated through the anion exchange membrane. The concentration of nitric acid in the anolyte can be maintained at a constant level by supplying water from a water supply line 5.

Likewise, in the catholyte, sodium hydroxide is formed by $OH^-$ ions formed by the hydrogen gas generating reaction as the cathode reaction and $Na^+$ ions permeated through the cation exchange membrane. The concentration of sodium hydroxide in the catholyte can be maintained at a constant level by supplying water from a water supply line 10.

As the anode, an electrode comprising a titanium expanded metal substrate coated with a noble metal oxide, was used. As the cathode, a nickel expanded metal was employed.

The electrode surface was 0.12 dm² each, and the distance between the anode and cathode was 2 cm.

The electrolytic test was conducted for one month at a current density of 30 A/dm² at an electrolytic temperature of 70° C. by supplying 5 mol/liter of an aqueous sodium nitrate solution to the intermediate compartment and maintaining the nitric acid concentration in the anode compartment at a level of 2 mol/liter and the concentration of the aqueous sodium hydroxide solution in the cathode compartment at a level of 3 mol/liter.

The cell voltage was about 7.5 V, the current efficiency for the production of nitric acid was about 63%, and the current efficiency for the production of sodium hydroxide was about 81%.

On the other hand, as Comparative Example 1, an electrolytic test was conducted in the same manner as in Example 1 except that a hydrocarbon-type anion exchange membrane was used instead of the fluorinated anion exchange membrane of Example 1, whereby the cell voltage was 7 V at the initial stage, but gradually increased as the time passes to a level of 12 V or higher, and the current efficiency for the production of nitric acid was about 53%, and the current efficiency for the production of sodium hydroxide was about 82%.

EXAMPLE 2

An electrolytic process for producing sulfuric acid and sodium hydroxide from an aqueous sodium sulfate solution was conducted by using a fluorinated anion exchange membrane (ion exchange capacity 1.00 meq/g dry resin, thickness: 130 μm) and having the following formula:

as the anion exchange membrane.

The electrolytic test was conducted for one month under the same condition as in Example 1 except that the fluorinated anion exchange membrane and the type of the salt were changed, whereby the cell voltage was about 7 V, the current efficiency for the production of sulfuric acid was about 62%, and the current efficiency of the production of sodium hydroxide was about 86%.

EXAMPLE 3

An electrolytic process for producing nitric acid and sodium hydroxide from an aqueous sodium nitrate solution was conducted by using a fluorinated anion exchange membrane (ion exchange capacity: 0.91 meq/g dry resin, thickness: 175 μm) and having the following formula:

as the anion exchange membrane.

The electrolytic test was conducted for one month under the same condition as in Example 1 except for the fluorinated anion exchange membrane, whereby the cell voltage was about 6.0 V, the current efficiency for the production of nitric acid was about 58%, and the current efficiency of the production of sodium hydroxide was about 80%.

EXAMPLES 4 and 5 and COMPARATIVE EXAMPLE 2

An electrolytic process for producing nitric acid and sodium hydroxide from an aqueous sodium nitrate solution by an ion exchange membrane electrolysis, was carried out.

As the anion exchange membrane, a fluorinated anion exchange membrane having an ion exchange capacity on one side of 0.62 meq/g dry resin in a thickness of 50 μm and an ion exchange capacity on the other side of 0.91 meq/g dry resin in a thickness of 125 μm, and having the following formula:

was employed.

As the cation exchange membrane, a Nafion membrane manufactured by DuPont Co. was used.

This electrolytic process is illustrated in FIG. 1.

The anion exchange membrane was disposed so that the side having a smaller ion exchange capacity faced the anode compartment side, and the side having a larger ion exchange capacity faced the intermediate compartment.

The electrolytic test was conducted for one month at a current density of 30 A/dm$^2$, at an electrolytic temperature of 70° C. by supplying 5 mol/liter of an aqueous sodium nitrate solution to the intermediate compartment and maintaining the nitric acid concentration in the anode compartment at a level of 2 mol/liter and the concentration of the aqueous sodium hydroxide solution in the cathode compartment at a level of 3 mol/liter.

As the results, the cell voltage was 8.0 V, the current efficiency for the production of nitric acid was about 87%, and the current efficiency for the production of sodium hydroxide was about 88%.

On the other hand, as Example 5, the same electrolytic tests as in Example 4 was conducted except that a uniform fluorinated anion exchange membrane having the same structure as in Example 4 and having an ion exchange capacity of 0.91 meq/g dry resin and a thickness of 175 μm was used, whereby the cell voltage was 7.8 V, the current efficiency for the production of nitric acid was about 61%, and the current efficiency for the production of sodium hydroxide was about 80%.

Further, as Comparative Example 2, the same electrolytic test as in Example 4 was conducted by using a hydrocarbon-type anion exchange membrane instead of the fluorinated anion exchange membrane of Example 4, whereby the cell voltage was 7 V at the initial stage, but gradually increased as the time passes to a level of 12 V or higher, and the current efficiency for the production of nitric acid was about 53%, and the current efficiency for the production of sodium hydroxide was about 82%.

EXAMPLES 6 and 7

By using the same fluorinated anion exchange membrane as used in Example 4, an electrolytic test for the production of nitric acid and sodium hydroxide from an aqueous sodium nitrate solution was conducted under the following conditions for one week each by the same apparatus as used in Example 4.

Figure 2:
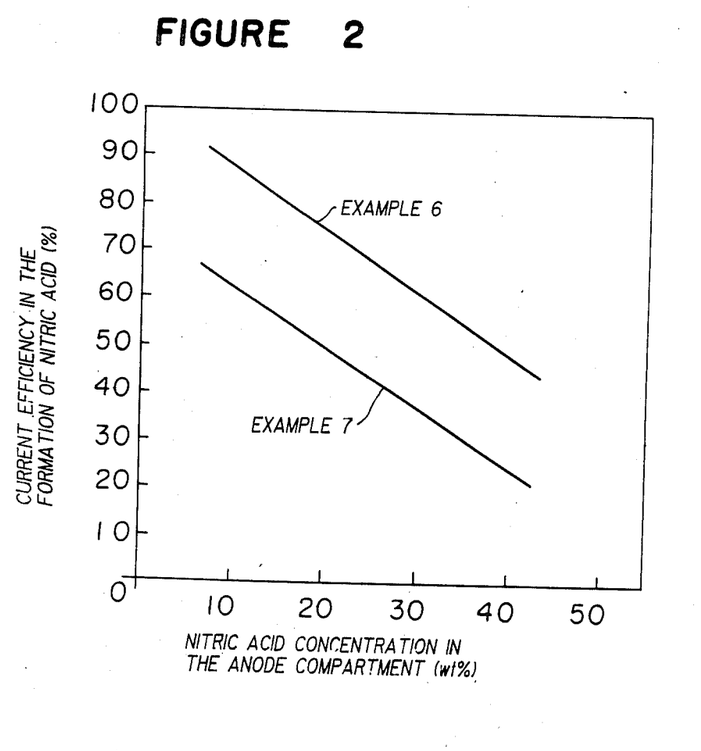
FIG. 2 shows a graph illustrating the results of the measurement of the current efficiency for the produc- tion of nitric acid in Example 2 of the present invention and Comparative Example 3.

Namely, in this Example, the current efficiency for the production of nitric acid was evaluated by varying the concentration of nitric acid in the anode compartment while maintaining the concentration of sodium nitrate in the intermediate compartment at a level of 7.0 mol/liter and the concentration of sodium hydroxide in the cathode compartment at a level of 6.1 mol/liter. The results are shown in FIG. 2.

As Example 7, an electrolytic test was conducted in the same manner as in Example 6 except that the same fluorinated anion exchange membrane as used in Example 5, was employed. The results are also shown in FIG. 2.

EXAMPLE 8

An electrolytic process for the production of sulfuric acid and sodium hydroxide from an aqueous sodium sulfate solution, was conducted by using a fluorinated anion exchange membrane having an ion exchange capacity on one side of 0.67 meq/g dry resin in a thickness of 40 μm and an ion exchange capacity on the other side of 1.00 meq/g dry resin in a thickness of 130 μm, and having the following structure:

The electrolytic test was conducted for one month under the same condition as in Example 4 except that the fluorinated anion exchange membrane and the type of the salt were changed, whereby the cell voltage was about 7.3 V, the current efficiency for the production of sulfuric acid was about 81%, and the current efficiency for the production of sodium hydroxide was about 83%.

EXAMPLE 9

An electrolytic process for the production of nitric acid and sodium hydroxide from an aqueous sodium nitrate solution, was conducted by using a fluorinated anion exchange membrane having an ion exchange capacity on one side of 0.62 meq/g dry resin in a thickness of 50 μm and an ion exchange capacity on the other side of 0.91 meq/g dry resin in a thickness of 125 μm, and having the following structure:

The electrolytic test was conducted for one month under the same condition as in Example 4 except for the fluorinated anion exchange membrane, whereby the cell voltage was about 6.7 V, the current efficiency for the production of nitric acid was about 81%, and the current efficiency for the production of sodium hydroxide was about 86%.

EXAMPLE 10

An electrolytic process for the production of sulfuric acid and sodium hydroxide from an aqueous sodium sulfate solution, was conducted by using a fluorinated anion exchange membrane having an ion exchange capacity on one side of 0.67 meq/g dry resin in a thickness of 40 μm and an ion exchange capacity on the other side of 1.00 meq/g dry resin in a thickness of 130 μm, and having the following structure:

The electrolytic test was conducted for one month under the same condition as in Example 4 except that the fluorinated anion exchange membrane and the type of the salt were changed, whereby the cell voltage was about 6.8 V, the current efficiency for the production of sulfuric acid was about 80%, and the current efficiency for the production of sodium hydroxide was about 85%.

EXAMPLES 11 AND 12 AND COMPARATIVE EXAMPLE 3

An electrolytic process for producing nitric acid and sodium hydroxide from an aqueous sodium nitrate solution by an ion exchange membrane electrolysis, was conducted.

As the anion exchange membrane, a fluorinated anion exchange membrane obtained by the following process, was employed.

Firstly, one side of the carboxylate membrane having the following formula:

was treated at 40° C. with 4N HCl for 70 hours, and then vacuum-dried at 60° C.

The membrane thus obtained, was immersed in dry tetrahydrofuran under a nitrogen atmosphere, and while supplying dimethylamine gas under cooling with ice, reacted for 12 hours under cooling and 36 hours at 25° C. Then, the membrane was vacuum-dried at 60° C. to obtain a carboxylic acid amide membrane.

Then, sodium borohydride was added to dry tetrahydrofuran under a nitrogen atmosphere, and the membrane obtained as above, was immersed therein. A boron trifluoride-ether complex was dropwise added thereto. The membrane was reacted at a refluxing temperature for 20 hours and converted to an amine membrane.

The membrane thus obtained was washed with tetrahydrofuran and methanol, and then immersed in a methanol solution of methyl iodide, and reacted at 60° C. for 96 hours.

Then, this membrane was immersed in a mixture of hydrochloric acid/methanol=$\frac{1}{2}$ to obtain a desired fluorinated anion exchange membrane having the groups involving quaternary ammonium groups. The fluorinated anion exchange membrane thus obtained, had an ion exchange capacity of 0.9 meq/g dry resin and a thickness of 150 μm.

A three compartment-type electrolytic cell was assembled by using this fluorinated anion exchange membrane and a Nafion membrane manufactured by DuPont Co. as the cation exchange membrane.

The electrolytic scheme was as shown in FIG. 1.

The anion exchange membrane was disposed so that the hydrochloric acid-treated side faced the anode compartment, and the other side faced the intermediate compartment side.

The electrolytic test was conducted for one month at a current density of 30 A/dm$^2$ at an electrolytic temperature of 70° C. by supplying 5 mol/liter of an aqueous sodium nitrate solution to the intermediate compartment and maintaining the nitric acid concentration in the anode compartment at a level of 2 mol/liter and the concentration of an aqueous sodium hydroxide solution in the cathode compartment at a level of 3 mol/liter.

As the results, the cell voltage was 7.8 V, the current efficiency for the production of nitric acid was about 88%, and the current efficiency for the production of sodium hydroxide was about 88%.

On the other hand, as Example 12, an electrolytic test was conducted in the same manner as in Example 11 by using a fluorinated anion exchange membrane produced by the same process as in Example 11 except that the acid treatment was omitted in the production of the fluorinated anion exchange membrane, whereby the cell voltage was 7.6 V, the current efficiency for the production of nitric acid was about 59%, and the current efficiency for the production of sodium hydroxide was about 79%.

Further, as Comparative Example 3, an electrolytic test was conducted in the same manner as in Example 11 except that a hydrocarbon-type anion exchange membrane was used instead of the fluorinated anion exchange membrane of Example 11, whereby the cell voltage was 7 V at the initial stage, but gradually increased as the time passes to a level of 12 V or higher, and the current efficiency for the production of nitric acid was about 53%, and the current efficiency for the production of sodium hydroxide was about 82%.

EXAMPLES 13 AND 14

An electrolytic test for producing nitric acid and sodium hydroxide from an aqueous sodium nitrate solution was conducted for one week each under the following conditions by the same apparatus as used in Example 11 by using the same fluorinated anion exchange membrane as used in Example 11.

Namely, in this Example, the current efficiency for the production of nitric acid was obtained when the nitric acid concentration in the anode compartment was varied while maintaining the concentration of sodium nitrate in the intermediate compartment at a level of 7.0 mol/liter and the sodium hydroxide concentration in the cathode compartment at a level of 6.1 mol/liter.

The results thereby obtained were substantially the same as those of Example 6 shown in FIG. 2.

Further, as Example 14, an electrolytic test was conducted in the same manner as in Example 13 except that the same fluorinated anion exchange membrane as used in Comparative Example 3, was used. The results were substantially the same as those of Example 7 shown in FIG. 2.

EXAMPLE 15

Both sides of the carboxylate membrane as used in Example 11, were treated at 40° C. with 4N HCl for 30 hours for the process for the preparation of a fluorinated anion exchange membrane, and then dried at 60° C., followed by the same process as in Example 11, to obtain a fluorinated anion exchange membrane (ion exchange capacity: 1.0 meq/g dry resin, thickness: 150 μm).

An ion exchange membrane electrolysis was conducted in the same manner as in Example 11 by using the above fluorinated anion exchange membrane, whereby cell voltage was 8.0 V, the current efficiency for the production of nitric acid was about 84%, and the current efficiency for the production of sodium hydroxide was about 87%.

EXAMPLE 16

One side of the carboxylate membrane as used in Example 11, was treated at 20° C. with 14% aqueous ammonia for 1 hour as a process for the preparation of a fluorinated anion exchange membrane, and then vacuum-dried at 60° C., followed by the same treatment as in Example 11, to obtain a fluorinated anion exchange membrane (ion exchange capacity: 1.0 meq/g dry resin, thickness: 150 μm).

An electrolytic process for producing sulfuric acid and sodium hydroxide from an aqueous sodium sulfate solution, was conducted by using the above fluorinated anion exchange membrane.

The electrolytic test was conducted for one month under the same conditions as in Example 11 except that the fluorinated anion exchange membrane and the type of the salt were changed, whereby the cell voltage was about 7.1 V, the current efficiency for the production of sulfuric acid was about 83%, and the current efficiency for the production of sodium hydroxide was about 84%.

REFERENCE EXAMPLE

A durability test of the special fluorinated anion exchange membranes of the present invention and the hydrocarbon-type anion exchange membranes were conducted, and the results are shown in Table 1.

The durability was evaluated in such a manner that membranes were immersed in the respective solutions for a predetermined period of time, then the electric resistance was measured in an aqueous sodium chloride solution having a concentration of 0.1 mol/liter, and the number of days until the electric resistance increased sharply was taken as the deterioration of the membrane. It is evident from Table 1 that the special fluorinated anion exchange membranes used in the present invention have superior durability as compared with the hydrocarbon-type anion exchange membranes.

TABLE 1

| | Membrane | |
|---|---|---|
| Test conditions | Fluorinated anion exchange membranes | Hydrocarbon test anion exchange membranes |
| 4N H$_2$SO$_4$ 80° C. | No change for more than 3 months | Deteriorated within a month |
| 3N HNO$_3$ 80° C. | No change for more than 3 months | Deteriorated within a month |
| Chlorine gas saturation 60° C., H$_2$O | No change for more than 3 months | Deteriorated within 10 days |

We claim:

1. A method for separating acid and alkaline components fron an aqueous salt solution by ion exchange electrolysis wherein a fluorinated cation exchange membrane is utilized as a diaphragm between a cathode compartment, wherein said alkaline compound forms, and an intermediate compartment, and a fluorinated anion exchange membrane is utilized as a diaphragm between an anode compartment, in which said acid forms, and said intermediate compartment, such that said acid is present in said anode compartment, said alkaline component is present in said cathode compartment and said salt is present in said intermediate compartment, wherein said anion exchange membrane is made of a copolymer having repeating units of the formula:

(I)

wherein X is F or CF$_3$, l is an integer of from 0 to 5, m is 0 or 1, n is an integer of 1 to 5, each p and q is a positive number and the ratio of p/q is from 2 to 16, and Y is a group involving a quaternary ammonium group.

2. A method according to claim 1, wherein the ion exchange capacity of said fluorinated anion exchange membrane varies between its front and rear faces in a ratio of from 1.1 to 6.0.

3. A method as in claim 1, wherein said anion exchange membrane is a fluorinated anion exchange membrane, prepared by subjecting a carboxylate membrane made of a copolymer having repeating units of the formula:

(II)

wherein X is F or CF₃, l is an integer of from 0 to 5, m is 0 or 1, n is an integer of from 1 to 5, p/q is from 4 to 16, and R is an alkyl group,
 to an acid or base treatment, and then introducing anion exchange groups thereinto.

4. The method according to claim 1, wherein the group involving a quaternary ammonium group has the formula:

wherein each of $R^1$, $R^2$ and $R^3$ is a lower alkyl group, provided that $R^1$ and $R^2$ may together form a tetramethylene group or a pentamethylene group, and $Z^\ominus$ is a halogen anion.

5. The method according to claim 1, wherein the group involving a quaternary ammonium group has the formula:

wherein each of $R^1$, $R^2$ and $R^3$ is a lower alkyl group, provided $R^1$ and $R^2$ may together form a tetramethylene group or a pentamethylene group, $R^4$ is a hydrogen atom or a lower alkyl group, and $Z^\ominus$ is a halogen anion.

6. The method according to claim 1, wherein the group involving a quaternary ammonium group has the formula:

wherein each of $R^1$, $R^2$ and $R^3$ is a lower alkyl group, provided $R^1$ and $R^2$ may together form a tetramethylene group or a pentamethylene group, each of $R^4$ and $R^5$ is a hydrogen atom or a lower alkyl group $Z^\ominus$ is halogen anion, and a is an integer of from 3 to 7.

7. The method according to claim 1, wherein the quaternary ammonium group has the formula:

wherein each of $R^1$, $R^2$, $R^3$ is a lower alkyl group, provided $R^1$ and $R^2$ may together form a tetramethylene group or a pentamethylene group, $R^4$ is a hydrogen atom or a lower alkyl group, provided $R^3$ and $R^4$ may together form an ethylene group or a trimethylene group, $Z^\ominus$ is a halogen anion, and b is an integer of from 2 to 10.

8. The method according to claim 3, wherein the anion exchange group has the formula:

wherein each of $R^1$, $R^2$ and $R^3$ is a lower alkyl group, provided that $R^1$ and $R^2$ may together form a tetramethylene group or a pentamethylene group, and $Z^\ominus$ is a halogen anion.

9. The method according to claim 3 wherein the anion exchange group has the formula:

wherein each of $R^1$, $R^2$ and $R^3$ is a lower alkyl group, provided $R^1$ and $R^2$ may together form a tetramethylene group or a pentamethylene group, $R^4$ is a hydrogen atom or a lower alkyl group, and $Z^\ominus$ is a halogen anion.

10. The method according to claim 3, wherein the anion exchange group has the formula:

wherein each of $R^1$, $R^2$ and $R^3$ is a lower alkyl group, provided $R^1$ and $R^2$ may together form a tetramethylene group or a pentamethylene group, each of $R^4$ and $R^5$ is a hydrogen atom or a lower alkyl group $Z^\ominus$ is halogen anion, and a is an integer of from 3 to 7.

* * * * *